United States Patent
Matsumoto

(12) 
(10) Patent No.: US 6,441,845 B1
(45) Date of Patent: Aug. 27, 2002

(54) IMAGE PICKUP APPARATUS ENLARGING A DYNAMIC RANGE OF AN IMAGE PICKUP SIGNAL

(75) Inventor: Kanichi Matsumoto, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/255,550

(22) Filed: Feb. 22, 1999

(30) Foreign Application Priority Data

Mar. 31, 1998 (JP) .......................................... 10-087325
Dec. 25, 1998 (JP) .......................................... 10-370491

(51) Int. Cl.[7] .............................. H04N 7/18; A62B 1/04
(52) U.S. Cl. ...................................... 348/65; 348/207
(58) Field of Search .............................. 348/65, 73, 76, 348/45, 46, 55, 68, 77, 72, 207, 229, 314, 255, 312, 311, 317, 221, 297; 600/109, 921

(56) References Cited

U.S. PATENT DOCUMENTS

| | | | |
|---|---|---|---|
| 4,631,593 A | * 12/1986 | Kinoshita et al. | ........... 348/314 |
| 4,704,633 A | * 11/1987 | Matsumoto | ............... 348/255 |
| 4,746,975 A | * 5/1988 | Ogiu | ........................... 348/76 |
| 4,884,134 A | * 11/1989 | Tsuji et al. | .................... 348/73 |
| 5,638,118 A | * 6/1997 | Takahashi et al. | .......... 348/207 |
| 5,883,666 A | * 3/1999 | Kyuma et al. | ............... 348/229 |

FOREIGN PATENT DOCUMENTS

JP 6-326917 11/1994

* cited by examiner

Primary Examiner—Chris Kelley
Assistant Examiner—Gims Philippe
(74) Attorney, Agent, or Firm—Ostrolenk, Faber, Gerb & Soffen, LLP

(57) ABSTRACT

An endoscopic image pickup apparatus includes a camera head incorporating image pickup apparatus, a scope to which the camera head is connected detachably, and a light source apparatus supplying illumination light to the scope. A camera control unit (CCU) is provided as a processor body performing signal processing for the image pickup means provided in the camera head. A monitor displays a standard picture signal processed by the CCU. A detection circuit in the CCU detects the luminance of an image from an RGB digital signal outputted by a color separation circuit, and a detection output of the detection circuit is outputted to a CPU. The CPU judges whether the luminance of an image is equal to or more than a predetermined value, and controls a peripheral interface (I/F) on the basis of the luminance value of the image. The peripheral I/F outputs set signals and a control signal to an exposure control circuit and a CCD driver.

15 Claims, 6 Drawing Sheets

NONLINEAR GAMMA CORRECTIVE FUNCTION

IMAGE PICKUP APPARATUS ENLARGING A DYNAMIC RANGE OF AN IMAGE PICKUP SIGNAL

BACKGROUND OF THE INVENTION

1. Field of the Invention

The present invention relates to an image pickup apparatus, and in particular, to an image pickup apparatus being characterized by a processing part of an image pickup signal in a long time exposure mode.

2. Related Art Statement

Image pickup apparatuses each having an imaging device outputting a subject image as an electric signal by performing photoelectric conversion of the subject image have been widely used in fields such as TV cameras and electronic endoscopes. In such an image pickup apparatus, a subject image is photoelectrically converted and is imaged by an imaging device storing and transferring electric charges.

Regarding such an image pickup apparatus, various apparatuses are proposed. The apparatuses each have sensitivity enhancement means with which it is possible to obtain an excellent subject image by enhancing sensitivity through changing an exposure time when the subject image is dark.

For example, an image pickup apparatus proposed in Japanese Unexamined Patent Publication No. 6-326917 has the following structure and features. Plural field period is set as an electric charge storage time of an imaging device by imaging-device drive means. Furthermore, when the apparatus reads a picture signal from the imaging device every plural field period, picture signal calculation control means performs predetermined calculations for a picture signal outputted from the imaging device and a picture signal stored in picture signal storage means. Moreover, the picture signal calculation control means outputs the picture signal every period that is shorter than the plural field period. Therefore, the apparatus can easily enhance sensitivity with little degradation of an S/N ratio and can obtain an excellent subject image, which has natural motion, even if the sensitivity is enhanced and the subject moves.

The image pickup apparatus proposed in Japanese Unexamined Patent Publication No. 6-326917 picks up a subject image with changing an exposure time from 1/60 sec to 1/30 sec through changing a mode from a normal exposure mode to a long time exposure mode if the subject becomes dark and an image thereof achieves a certain luminance. Nevertheless, since the exposure time is changed from 1/60 sec to 1/30 sec in this manner, the luminance of an image obtained sharply changes, and hence the image seems to be unnatural. This is a problem of this apparatus.

SUMMARY OF THE INVENTION

The invention provides an image pickup apparatus with which it is possible to obtain a natural image without disharmonies by continuously changing luminance in the long time exposure mode.

The present invention also provides an image pickup apparatus with which it is possible to obtain a natural image without disharmonies by continuously changing luminance in the long time exposure mode even in regard to nonlinear image processing.

An image pickup apparatus of the present invention comprises: an imaging device photoelectrically converting a subject image and outputting the subject image as an image pickup signal every field period; imaging device drive means for obtaining the image pickup signal by controlling an exposure time and driving the imaging device so that an electric charge storage period of the imaging device can be changed; field delay means for delaying the image pickup signal from the imaging device by one field; and picture signal generation means for generating a picture signal, having predetermined luminance, from a field of image pickup signal from the imaging device and an image pickup signal delayed by one field from the field delay means. The image pickup apparatus makes it possible to obtain a natural image without disharmonic feeling by continuously changing luminance in the long time exposure mode through the field delay means for delaying the image pickup signal from the imaging device by one field and the picture signal generation means for generating a picture signal from a field of image pickup signal from the imaging device and the image pickup signal delayed by one field from the field delay means.

Other features and advantages of the present invention will be sufficiently apparent from the following description.

BRIEF DESCRIPTION OF THE DRAWINGS

FIG. 1 is a schematic diagram showing the structure of an endoscopic image pickup apparatus, and FIG. 2 is a schematic diagram showing the structure of a camera control unit (CCU) shown in FIG. 1.

FIG. 3 is a schematic diagram showing the structure of an exposure control circuit shown in FIG. 2, FIG. 4 is a flow chart for explaining the operation of the CCU shown in FIG. 2, and FIG. 5 is a timing chart for explaining the operation of the CCU shown in FIG. 2.

FIG. 6 is a schematic diagram showing the structure of a CCU, and

FIG. 7 is an explanatory diagram for explaining the operation of a knee and γ correction circuit shown in FIG. 6. Furthermore, FIG. 8 is an explanatory diagram for explaining the memory space structure of an LUT constructing the knee and γ correction circuit shown in FIG. 6.

DESCRIPTION OF THE PREFERRED EMBODIMENTS

First Embodiment

Structure

Figure 1:
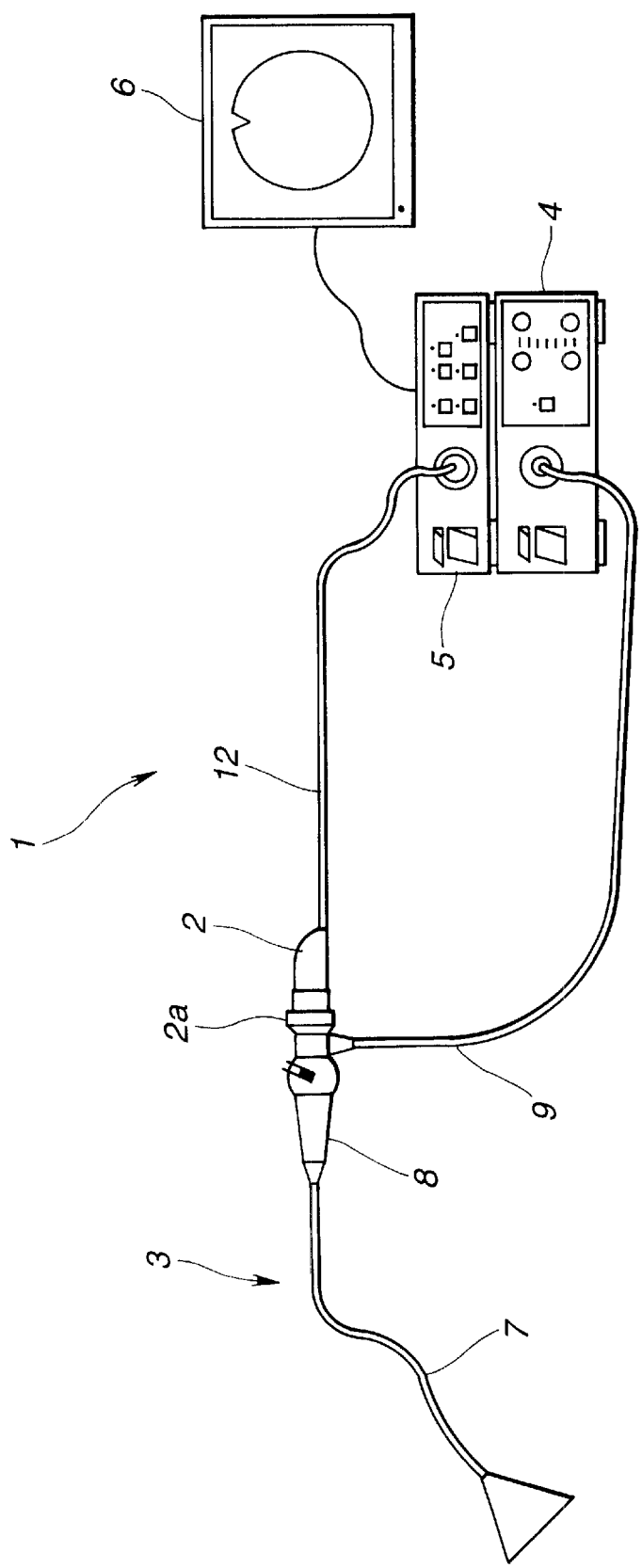
FIGS. 1 through 5 relate to a first embodiment of the present invention.

As shown in FIG. 1, an endoscopic image pickup apparatus 1 of the present invention comprises: a camera head 2 incorporating image pickup means; a scope 3 to which camera head 2 is connected detachably; a light source apparatus 4 supplying illumination light to scope 3; a camera control unit (hereinafter, this is abbreviated as a CCU) 5 as a processor body performing signal processing to the image pickup means provided in the camera head 2; and a TV monitor 6 displaying a standard picture signal signal-processed by CCU 5.

The scope 3 is, for example, an optical endoscope having an inserted section 7 that includes therein an image guide fiber (not shown) transmitting an endoscopic image, and is slender and flexible. Furthermore, the scope 3 can pick up an endoscopic image, which is transmitted to an eyepiece portion of an operating section 8 through an image guide fiber (not shown), with the camera head 2 by detachably connecting the camera head 2 through an adapter 2a to the eyepiece portion of the operating section 8 which is provided at a base end of this inserted section 7.

In addition, a light guide cable 9 extends from the operating section 8 of the scope 3, and an end of the light guide cable 9 is connected to the light source apparatus 4. Therefore, illumination light supplied from the light source apparatus 4 is applied from an end of the scope 3 to a subject (not shown) with a light guide (not shown) passing through the light guide cable 9 and inserted-section 7.

Thus, when the endoscopic image pickup apparatus 1 is used, by the light source apparatus 4 being equipped with the light guide cable 9 of the scope 3, the illumination light of a lamp in the light source apparatus 4, which is not shown, passes through a stop. Furthermore, the illumination light is condensed by a lens, and is poured into an end face of the light guide facing the lamp. This illumination light is transmitted to the scope 3 with the light guide, and forward from an end of the scope 3 through the inside of the scope 3 to illuminate the subject such as patient's internal body cavities.

In addition, the reflected light of the subject illuminated by the illumination light is imaged by the scope 3, and a subject image is picked up by the image pickup means in the camera head 2 through the scope 3.

On the other hand, in the camera head 2, a CCD 11 is located on a focal plane of an image pickup lens as the image pickup means (refer to FIG. 2), and the subject image is imaged on the image pickup face of the CCD 11 to be photoelectrically converted. CCD 11 is connected to the CCU 5 through a camera cable 12 that extends from the camera head 2 and includes a CCD drive signal transmission line and a CCD output signal transmission line therein. Hence, an output signal of the CCD 11 is sent to the CCU 5, and various signal processing is performed. A picture signal outputted from the CCU 5 is sent to the TV monitor 6, and an observation image of the subject is displayed on the TV monitor 6.

Figure 2:
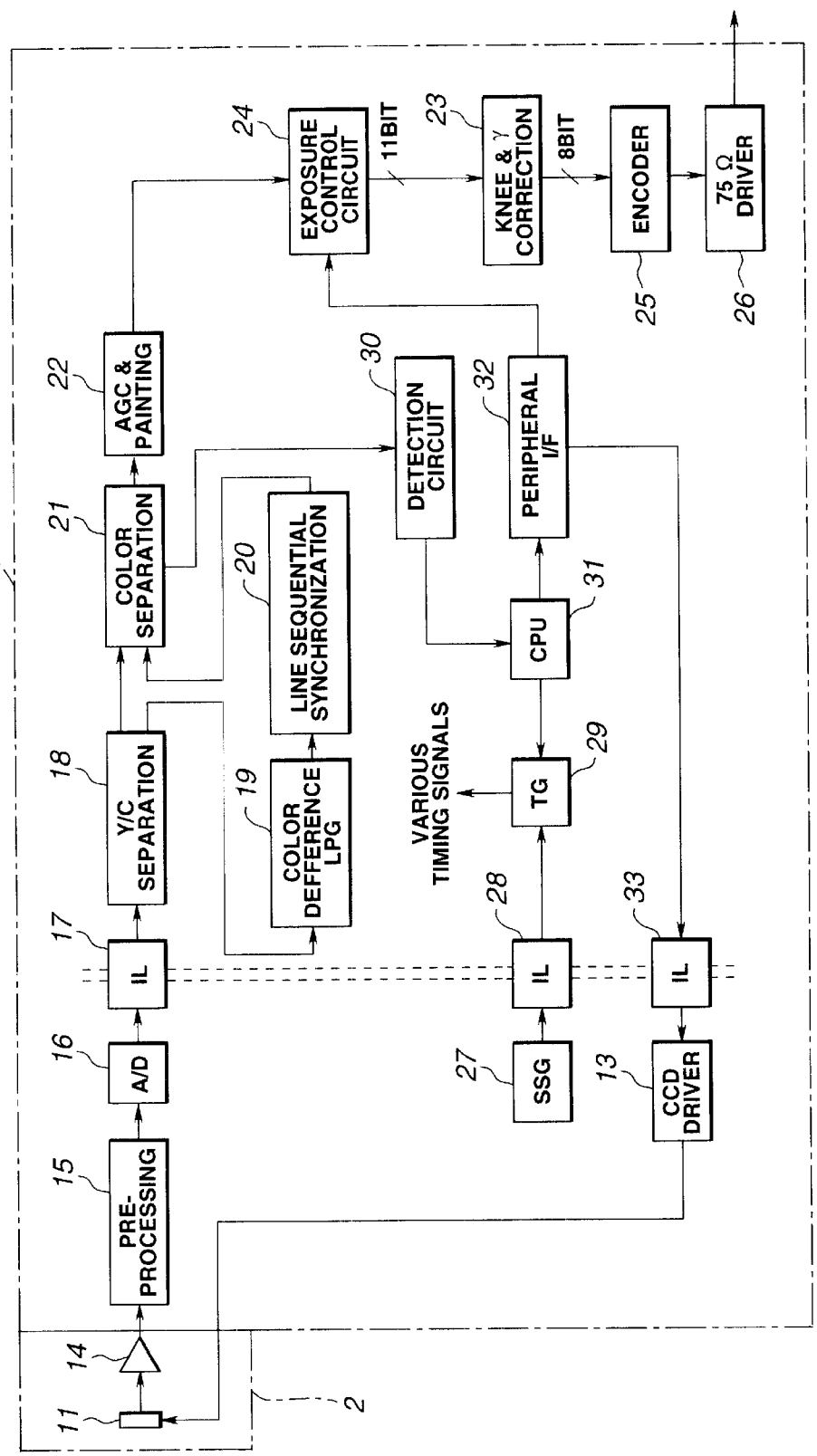

As shown in FIG. 2, in the CCU 5, a CCD driver 13 driving and controlling the CCD 11 is located. The CCD driver 13 supplies a CCD drive signal to the CCD 11 through the CCD drive signal transmission line in the camera cable 12. Signal charges stored in the CCD 11 are read as a CCD output signal.

In addition, a CCD output signal read from the CCD 11 is amplified by the preamplifier 14, and is transmitted to the CCD 5 through the CCD output signal transmission line in the camera cable 12 to be inputted to a preprocessing circuit 15 in the CCU 5.

An A/D converter 16, an isolation circuit (hereinafter, this is abbreviated as an IL) 17, and a Y/C separation circuit 18 are provided as subsequent stages of the preprocessing circuit 15. The CCD output signal inputted to the preprocessing circuit 15 is inputted to the A/D converter 16 after preprocessing such as CDS (Correlative Double Sampling) and S/H (Sample and Hold) processing, and is converted into a digital signal by being inputted to the A/D converter 16 thereafter. Furthermore, the CCD output signal is electrically isolated by the IL 17 to be inputted to the Y/C separation circuit 18.

A color difference LPF (Low-Pass Filter) 19, a line sequential synchronization circuit 20, and a color separation circuit 21 composed of an RGB matrix are provided as subsequent stages of the Y/C separation circuit 18. The digital signal inputted to the Y/C separation circuit 18 is separated into a luminance signal Y and a chrominance signal C. The line sequential synchronization circuit 20 performs line-sequential processing of the chrominance signal C as a subsequent stage of the color difference LPF 19 removing false color. The color separation circuit 21 receives three lines of digital signals Y, CR, and CB, which the color separation circuit 21 converts into an RGB digital signal.

An AGC and painting circuit 22, an exposure control circuit 24, and a knee and γ correction circuit 23 are provided as subsequent stages of the color separation circuit 21. The AGC and painting circuit 22 performs gain control and painting processing of the RGB digital signal from the color separation circuit 21, and thereafter, the exposure control circuit 24 performs exposure control processing of the RGB digital signal that is described later. Furthermore, the knee and γ correction circuit 23 performs knee processing, which compresses information of a high luminance portion, and nonlinear γ correction processing of the RGB digital signal.

Owing to this knee processing and γ correction processing by the knee and γ correction circuit 23, for example, a digital signal (input), composed of 11-bit data, in the previous stage becomes an 8-bit digital signal (output).

An encoder 25 is provided as a subsequent stage of the knee and γ correction circuit 23. The encoder 25 converts the digital signals into a standard TV signal, for example, an NTSC signal, and the 75Ω driver 26 outputs the standard TV signal to the TV monitor 6 with impedance matching.

In addition, a standard signal generator (hereinafter, this is abbreviated as an SSG) 27 is provided in the CCU 5. A timing signal generator (hereinafter, this is abbreviated as a TG) 29 generates various timing signals supplied to the above-described various circuits on the basis of a standard clock signal generated by the SSG 27 electrically insulated through an IL 28.

Furthermore, a detector circuit 30 detecting the luminance of an image from the RGB digital signal supplied by the color separation circuit 21 is provided in the CCU 5. The detected output of detector circuit 30 is outputted to a CPU 31. The CPU 31 judges whether the luminance of the image is equal to or more than a predetermined value and controls a peripheral interface (hereinafter, this is abbreviated as a peripheral I/F) on the basis of the luminance value of the image. Furthermore, the peripheral. I/F 32 outputs set signals and control signals to the exposure control circuit 24 and CCD driver 13. Here, the control signal from the peripheral I/F 32 to the CCD driver 13 is electrically insulated by IL 33.

In addition, ILs 17, 28, and 33 are provided so as to secure safety by electrically insulating the side of the scope 3 from the side of the CCU 5, because the endoscopic image pickup apparatus 1 is a medical instrument.

Figure 3:
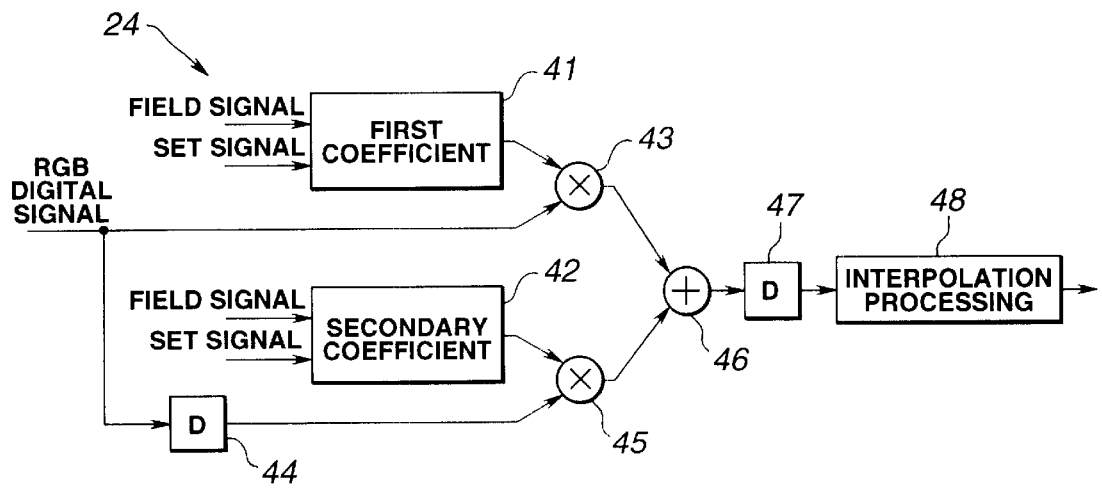

The exposure control circuit 24, as shown in FIG. 3, comprises: a first coefficient register 41 and a second coefficient register 42 that each receive a field signal (H: A-field, L: B-field) from the TG 29 and a set signal from the peripheral I/F 32 controlled by the CPU 31, and outputs a coefficient signal shown in Table 1, which corresponds to the set signal from the peripheral I/F 32 with synchronizing with each one field period by judging one field period with an edge of the field signal; a first multiplier 43 multiplying an 11-bit RGB digital signal through the AGC and painting circuit 22 by the coefficient signal from the first coefficient register 41; a delay circuit 44 that delays the RGB digital signal through the AGC and painting circuit 22 by one field period and is composed of field memory; and a second multiplier 45 multiplying the RGB digital signal, delayed by one field period by the delay circuit 44, by the coefficient signal from the second coefficient register 42.

|  | Output of 1st Coefficient Register | Output of 2nd Coefficient Register |
| --- | --- | --- |
| In Normal Exposure Mode | 0 | 1 |
| In Long Time Exposure Mode | 1 | 1 |
| When Switching from Normal Mode to Long Time | 0 | 1 |
| When Switching from Long Time Mode to Normal | 1 | 0 |

Furthermore, the exposure control circuit 24 comprises: an adder 46 adding an output of the first multiplier 43 to an output of the second multiplier 45; a delay-circuit 47 delaying an output of the adder 46 by one field period; and an interpolation processing circuit 48 performing interpolation processing to the output of the delay circuit 47.

Operation

Next, the operation of this embodiment constructed like this will be described. In this embodiment, for simple explanation, an example of luminance linearly changing will be described.

A physician inserts the inserted section 7 of the scope 3 into an internal cavity, supplies illumination light from the light source apparatus 4 to the scope 3, and picks up an endoscopic image transmitted to the eyepiece portion with the CCD 11 of the camera head 2. The CCU 5 detects the luminance of the image with the detector circuit 30 while performing signal processing of this image pickup signal.

Figure 4:
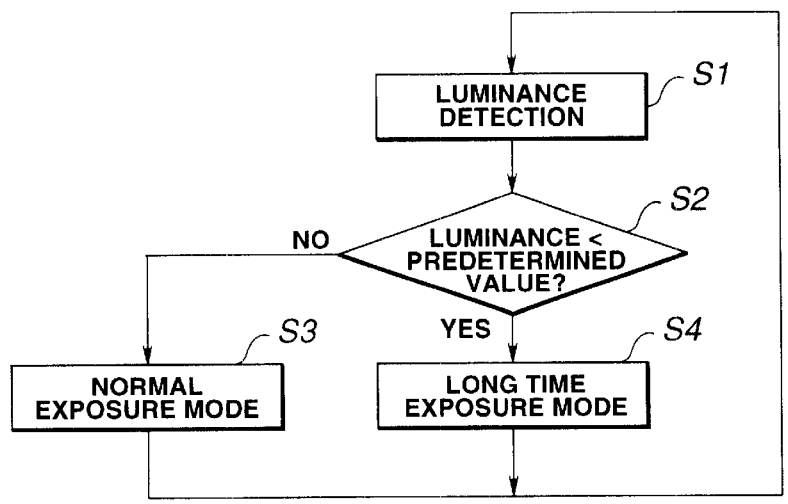

As shown in FIG. 4, at step S1, the CPU 31 receives a luminance signal detected by the detector circuit 30, and judges at step S2 whether the luminance signal is smaller than a predetermined value. If the luminance signal is equal to or larger than the predetermined value, the CPU 31 controls the peripheral I/F 32 by outputting a trigger signal to the peripheral I/F 32 according to the luminance signal for picking up an image in a normal exposure mode at step S3. If smaller, the CPU 31 controls the peripheral I/F 32 for picking up an image in a long time exposure mode at step S4. This processing are repeated.

Figure 5:
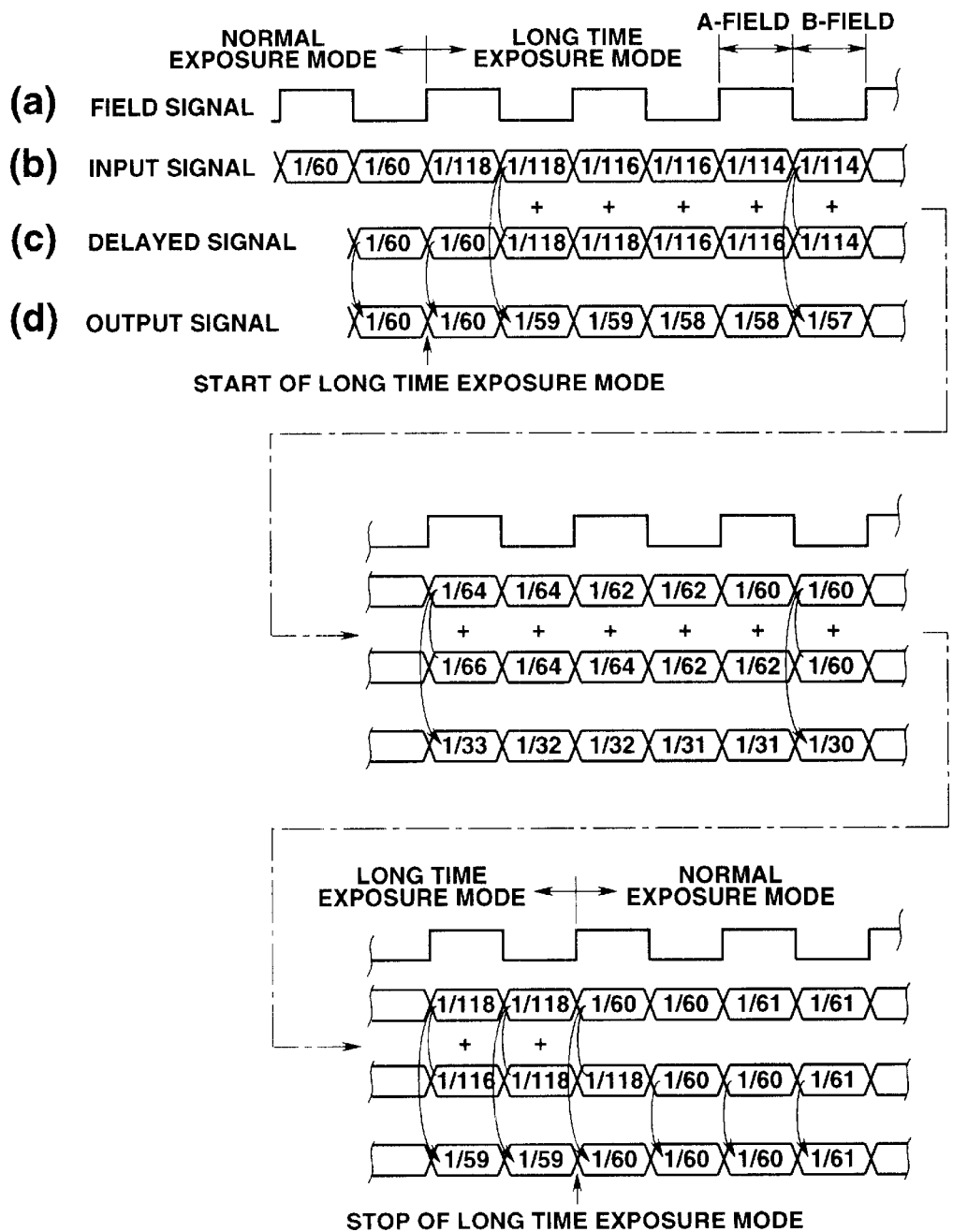

In the image pickup in the normal exposure mode at step S3, as shown in FIG. 5, the peripheral I/F 32 outputs "0" to the first coefficient register 41 and "1" to the second coefficient register 42 as the set signals. Furthermore, the peripheral I/F 32 outputs the control signal to the CCD driver 13 so as to read an image pickup signal, which is obtained by the electric charge storage with exposure in the exposure time of $1/60$ sec, every period of, for example, $1/60$ sec according to the luminance signal.

In this case, the first coefficient register 41 outputs a coefficient signal "0" to the first multiplier 43, and the second coefficient register 42 outputs a coefficient signal "1" to the second multiplier 45 (refer to Table 1). Therefore, an output of the exposure control circuit 24 in one field period becomes the image pickup signal (delayed by the delay circuit 44) that is obtained by the electric charge storage with exposure in the exposure time of $1/60$ sec.

In addition, in one field period just after switching from the normal exposure mode to the long time exposure mode at the time of the luminance signal becoming smaller than the predetermined value, the peripheral I/F 32 outputs the set signals similar to the above ("0" to the first coefficient register 41 and "1" to the second coefficient register 42) to the first and second coefficient registers 41 and 42 of the exposure control circuit 24 according to a trigger signal output of the CPU 31. At the same time, the peripheral I/F 32 outputs the control signal to the CCD driver 13 so as to read an image pickup signal, which is obtained by the electric charge storage with the exposure of the exposure time of $1/118$ sec that is image pickup with fast shutter speed, every period of $1/60$ sec in one field period.

In this case, the first coefficient register 41 outputs a coefficient signal "0" to the first multiplier 43, and the second coefficient register 42 outputs a coefficient signal "1" to the second multiplier 45 (refer to Table 1). Therefore, also, an output of the exposure control circuit 24 in one field period is the image pickup signal (delayed by the delay circuit 44) that is obtained by the electric charge storage with exposure in the exposure time of $1/60$ sec.

In the image pickup in the long time exposure mode at step S4 after switching from the normal exposure mode to the long time exposure mode, the peripheral I/F 32 outputs "1" to the first and second coefficient registers 41 and 42 respectively as the set signal. Furthermore, the peripheral I/F 32 outputs the control signal to the CCD driver 13 so as to read an image pickup signal, which is obtained by the electric charge storage with the exposure of the exposure time of $1/118$ sec that is image pickup in fast shutter speed, every period of $1/60$ sec in one field period.

Consequently, the first coefficient register 41 outputs a coefficient signal "1" to the first multiplier 43, and the second coefficient register 42 outputs a coefficient signal "1" to the second multiplier 45 (refer to Table 1). Therefore, also, an output of the exposure control circuit 24 in one field period is an image pickup signal corresponding to the luminance at the time of exposure in the exposure time of $1/59$ sec that is obtained by adding an image pickup signal, which is obtained by the electric charge storage with exposure in the exposure time of $1/118$ sec and is read at this time, and an image pickup signal in a previous field, which is obtained by the electric charge storage with exposure in the exposure time of $1/118$ sec and is delayed by one field period, by the delay circuit 44.

In the image pickup in the long time exposure mode at step S4, if the luminance signal becomes linearly small, the peripheral I/F 32 continues to output "1" to the first and second coefficient registers 41 and 42 of the exposure control circuit 24 respectively as the set signals.

In consequence, the first coefficient register 41 outputs a coefficient signal "1" to the first multiplier 43, and the second coefficient register 42 outputs a coefficient signal "1" to the second multiplier 45 (refer to Table 1). At the same time, as shown in FIG. 5, the peripheral I/F 32 outputs the control signal to the CCD driver 13 so as to sequentially lengthen the exposure time from $1/118$ sec every two-field period (that is, one frame period). Owing to this, an output from the exposure control circuit 24 sequentially changes from an image pickup signal having the luminance obtained by exposure in the exposure time of $1/59$ sec to an image pickup signal having the luminance obtained by exposure in the exposure time of $1/30$ sec.

Thus, the peripheral I/F 32 under the control of the CPU 31 outputs the control signal to the CCD driver 13 so as to read an image pickup signal, which is obtained by the electric charge storage with exposure in the exposure time of $1/116$ sec that is longer than $1/118$ sec, every period of $1/60$ sec in two-field period (that is, one frame period) after electric charge storage with exposure in the exposure time of $1/118$ sec. Therefore, an output from the exposure control circuit 24 becomes an image pickup signal, corresponding to the luminance at the time of exposure in the exposure time of $1/59$ sec, in a first field period of one frame at this time. Furthermore, the output from the exposure control circuit 24 becomes an image pickup signal, corresponding to the luminance at the time of exposure in the exposure time of $1/58$ sec, in a next field period.

In addition, the peripheral I/F 32 under the control of the CPU 31 outputs the control signal to the CCD driver 13 so as to read an image pickup signal, which is obtained by the electric charge storage with exposure in the exposure time of $1/114$ sec, every period of $1/60$ sec in a next two-field period (that is, one frame period). Therefore, an output from the exposure control circuit 24 becomes an image pickup signal, corresponding to the luminance at the time of exposure in the exposure time of $1/58$ sec, in a first field period of one frame at this time. Furthermore, the output from the exposure control circuit 24 becomes an image pickup signal, corresponding to the luminance at the time of exposure in the exposure time of $1/57$ sec, in a next field period.

Furthermore, finally, the peripheral I/F 32 outputs the control signal to the CCD driver 13 so as to read an image pickup signal, which is obtained by the electric charge storage with exposure in the exposure time of $1/60$ sec, in the period of $1/60$ sec in a two-field period (that is, one frame period). Therefore, an output from the exposure control circuit 24 becomes an image pickup signal, having the luminance at the time of exposure in the exposure time of $1/31$ sec, in a first field period of one frame at this time. Moreover, the output from the exposure control circuit 24 becomes an image pickup signal, corresponding to the luminance at the time of exposure in the exposure time of $1/30$ sec that is the longest exposure time, in a next field period.

In addition, while the luminance signal becomes, for example, linearly large from a dark state to a predetermined luminance, contrary to the above, the peripheral I/F 32 outputs the control signal to the CCD driver 13 so as to sequentially shorten the exposure time of the image pickup in fast shutter speed every two-field period (that is, a frame period). Therefore, an output from the exposure control circuit 24 sequentially changes from an image pickup signal corresponding to the luminance at the time of exposure in the exposure time of $1/30$ sec to an image pickup signal corresponding to the luminance at the time of exposure in the exposure time of $1/59$ sec.

Furthermore, in one field period just after switching from the long time exposure mode to the normal exposure mode at the time of the luminance signal becoming to the predetermined value, according to a trigger signal output of the CPU 31, the peripheral I/F 32 outputs the set signal "1" to the first coefficient register 41 and "0" to the second coefficient register 42, the first and second coefficient registers 41 and 42 which construct the exposure control circuit 24. At the same time, the peripheral I/F 32 outputs the control signal to the CCD driver 13 so as to read an image pickup signal, which is obtained by the electric charge storage with the exposure of the exposure time of $1/60$ sec, every period of $1/60$ sec in one field period.

In this case, the first coefficient register 41 outputs a coefficient signal "1" to the first multiplier 43, and the second coefficient register 42 outputs a coefficient signal "0" to the second multiplier 45 (refer to Table 1). Therefore, an output of the exposure control circuit 24 in one field period is the image pickup signal obtained by the electric charge storage with exposure in the exposure time of $1/60$ sec.

In the image pickup in the normal exposure mode after switching from the long time exposure mode to the normal exposure mode, the peripheral I/F 32 outputs "0" to the first coefficient registers 41 and "1" to the second coefficient register 42 respectively as the set signals. Furthermore, if the luminance signal changes larger than the predetermined value, the peripheral I/F 32 outputs the control signal to the CCD driver 13 so as to read an image pickup signal, which is obtained by the electric charge storage with the exposure of the exposure time of $1/61$ sec in a two-field period, every period of $1/60$ sec.

Consequently, the first coefficient register 41 outputs a coefficient signal "0" to the first multiplier 43, and the second coefficient register 42 outputs a coefficient signal "1" to the second multiplier 45 (refer to Table 1). Therefore, an output of the exposure control circuit 24 in a next field period is an image pickup signal that is obtained by the electric charge storage with exposure in the exposure time of $1/61$ sec and is delayed by one field period by the delay circuit 44.

In addition, if the luminance signal sequentially becomes, for example, linearly large, it is possible to perform the image pickup in fast shutter speed, wherein exposure time can be continuously changed, by shortening the exposure time to $1/62$ sec in a next two-field period and further sequentially shortening the exposure time. Therefore, it is possible to obtain an image pickup signal having the predetermined luminance.

Furthermore, a case of the luminance signal linearly changing is exemplified in the above description for simple explanation. Nevertheless, in fact, the CPU 31 controls set signals to the first and second coefficient registers 41 and 42 of the exposure control circuit 24 and the control signal to the CCD driver 13, both types of signals which are generated by the peripheral I/F 32, so as to obtain an image pickup signal always having the predetermined luminance continuously (so that the luminance signal detected by the detector circuit 30 may become the predetermined value).

Effects

In this manner, according to this embodiment, an image pickup signal, which is obtained by the electric charge storage with the exposure in the exposure time in the fast shutter speed, is used in the long time exposure mode. Furthermore, an image pickup signal, which is obtained by the exposure in first image pickup in fast shutter speed and is delayed by one field, are added to an image pickup signal in a next field, which is obtained by the exposure in second image pickup in fast shutter speed. Owing to this addition, an image pickup signal having the luminance corresponding to the exposure time that is longer than $1/60$ sec is generated. Therefore, it is possible to variably change the image pickup signal continuously with respect to a subject, whose luminance is changeable, to the level of the predetermined luminance, and hence it is possible to obtain an image that is natural without disharmonies.

In addition, the scope 3 is an optical endoscope, having the inserted section 7 incorporating the image guide fiber, in this embodiment, but the scope 3 is not limited to this. Thus, a hard endoscope, having image transmission means composed of a relay lens and the like, or an electronic endoscope, having a solid-state imaging device, which does not need the camera head 2, inside an end portion of the inserted section can be also used as the scope 3. Therefore, it is needless to say that similar operation and effects also can be obtained by these endoscopes.

In addition, in this embodiment, the exposure control circuit 24 is located just before the knee and $\gamma$ correction circuit 23 performs nonlinear processing, but circuit layout is not limited this. The exposure control circuit 24 can be located in any location so long as the circuit 24 is a preceding stage to the knee and γ correction circuit 23 performing the nonlinear processing.

Second Embodiment

Since a second embodiment is similar to the first embodiment, only the different points will be described. Furthermore, the same symbols are assigned to the same components and description of them will be omitted.

Construction and Operation

Figure 6:
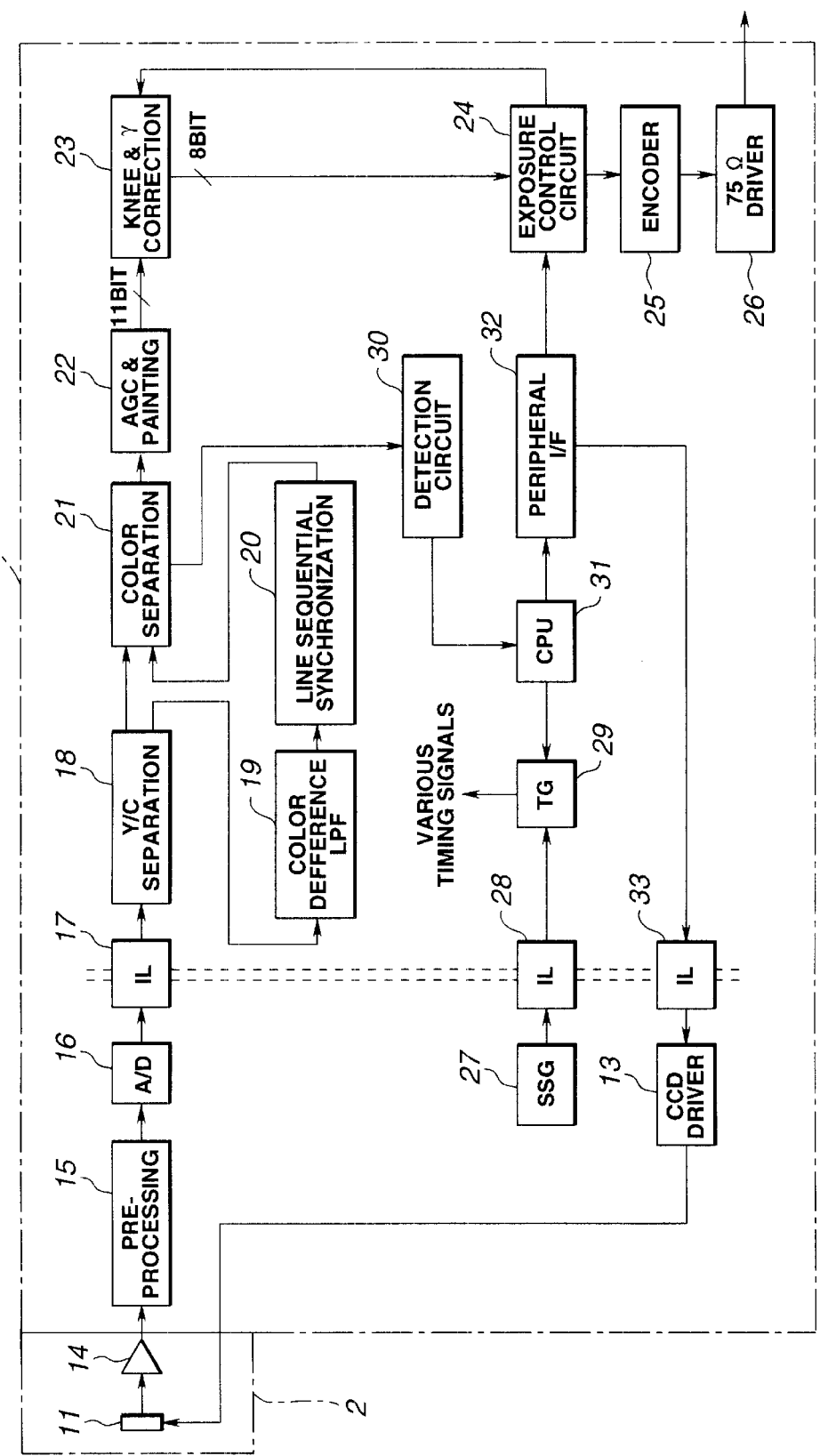
FIGS. 6 through 8 relate to a second embodiment.

As shown in FIG. 6, in this embodiment, the exposure control circuit 24 is located as a subsequent stage of the knee and γ correction circuit 23 performing the nonlinear processing. As described in the first embodiment, by performing the knee processing and γ correction processing in the knee and γ correction circuit 23, owing to information compression processing on a high luminance portion, for example, a digital signal (input) in a preceding stage that is composed of 11-bit data becomes an 8-bit digital signal (output).

Thus, if the exposure control circuit 24 is located as a preceding stage of the knee and γ correction circuit 23 like the first embodiment, the number of bits in multiplication and addition becomes large and the size of a circuit becomes large since two multipliers and an adder are used in the exposure control circuit 24. Nevertheless, by locating the exposure control circuit 24 as the subsequent stage of the knee and γ correction circuit 23, it becomes possible to reduce the size of the exposure control circuit 24 in comparison with that in the first embodiment. This is because multiplication and addition changes from the calculation of 11-bit figures to the calculation of 8-bit figures.

Figure 7:
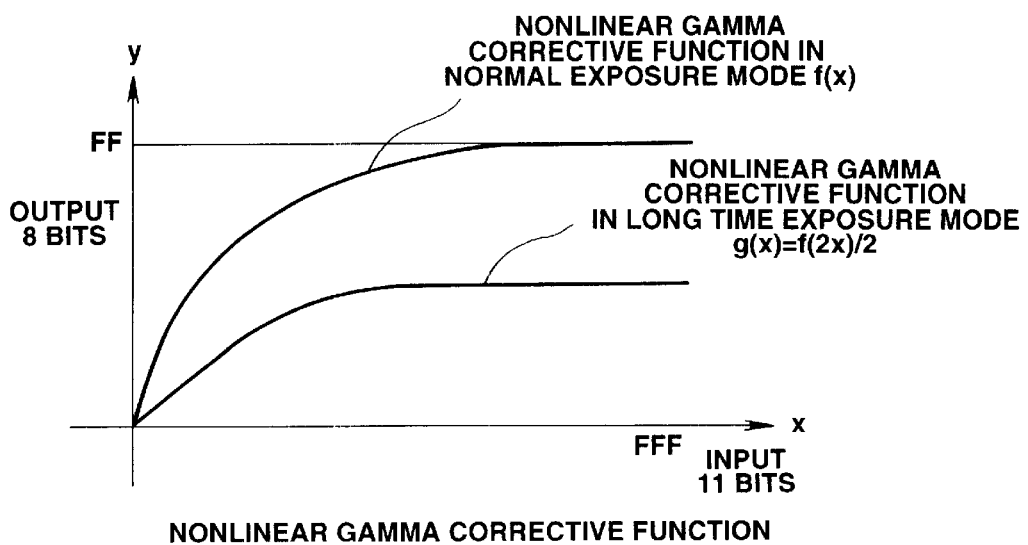

Generally speaking, the knee and γ correction circuit 23 uses an LUT (lookup Table ROM) since its processing is nonlinear. Therefore, as shown in FIG. 7, the LUT outputs a knee & γ corrective function f(x) from the input x as an output y.

If the exposure control circuit 24 is located as the subsequent stage of the knee and γ correction circuit 23 like this embodiment, the exposure control circuit 24 performs addition with respect to the knee & γ corrective processing function, that is, the knee & γ corrective function f(x) even in the long time exposure mode. Therefore, the output y becomes as follows:

$$y=f(x)+f(x)=2f(x)$$

Nevertheless, the output y in the long time exposure mode that should be primarily obtained is an output y corresponding to the input added in the exposure control circuit 24 before the knee and γ correction circuit 23 like that in the first embodiment as follows:

$$y=f(x+x)=f(2x)$$

Then, in this embodiment, let the nonlinear gamma corrective function in the knee and γ correction circuit 23 in the long time exposure mode be g(x). Then, the following data is stored in the LUT:

$$g(x)=f(2x)/2$$

Owing to this, the output y of the exposure control circuit 24 in the long time exposure mode is:

$$y=g(x)+g(x)=f(2x)/2+f(2x)/2=f(2x)$$

Therefore, it is possible to obtain the output y in the long time exposure mode that should be primarily obtained.

Figure 8:
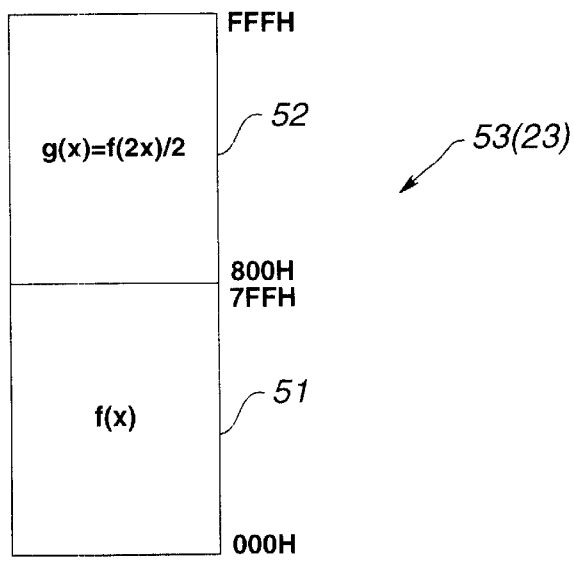

Concretely, the knee and γ correction circuit 23 according to this embodiment comprises an LUT 53 that stores, as shown in FIG. 8, with respect to the 11-bit input x the nonlinear gamma corrective function f(x) in the normal exposure mode in a lower memory space 51 and the nonlinear gamma corrective function g(x) in the long time exposure mode in an upper memory space 52.

Switching between the lower and upper memory spaces 51 and 52 for reading can be performed as follows. For example, the exposure control circuit 24 performs AND logical operation of the output from the first coefficient register 41 and the output from the first coefficient register 41 (refer to Table 1), and outputs the result of the AND logical operation as a space switching signal to the knee and γ correction circuit 23. Furthermore, the knee and γ correction circuit 23 receives this space switching signal as the most significant address bit for the LUT 53 to switch access to the lower memory space 51 or upper memory space 52.

In addition, switching between the lower and upper memory spaces 51 and 52 for reading is not limited to the above, but the switching also can be performed by outputting a control signal from the CPU 31 or peripheral I/F 32 to the knee and γ correction circuit 23.

Furthermore, in the long time exposure mode, the delay circuit 44 delays the 8-bit nonlinear gamma corrective function g(x), which is read from the knee and γ correction circuit 23 by the exposure control circuit 24, by one field. At the same time, according to Table 1, the exposure control circuit 24 performs multiplication and addition of this 8-bit nonlinear gamma corrective function g(x), which is delayed by one field, and a 8-bit nonlinear gamma corrective function g(x) in one field in the next stage. Owing to this, exposure control in the long time exposure mode is performed. As for details thereof, since this is the similar to that of the first embodiment, description will be omitted.

Effects

In this manner, in this embodiment, it is possible to drop the size of a circuit in comparison with that in the first embodiment in addition to achieving the effects of the first embodiment. This is because, for example, the multiplication and addition of 11-bit figures becomes that of 8-bit figures since the exposure control circuit 24 is located as the subsequent stage of the knee and γ correction circuit 23.

In this invention, it is apparent that working modes different in a wide range can be formed on the basis of the present invention without departing from the spirit and scope of the present invention. The present invention is not restricted by any specific embodiment except being limited by the appended claims.

What is claimed is:

1. An image pickup apparatus comprising:

a charge storage type imaging device that converts subject images into electrical image signals, each image signal being characterized by a field period;

a drive circuit that determines an exposure time for an image by controlling the charge storage period of the imaging device;

a detection circuit operative to generate output signals according to luminance levels of fields of the image signals;

a picture signal generation circuit including a delay circuit that delays a signal from the imaging device by one field period, the picture signal generation circuit being responsive to an image signal for a first field period, and to an image signal for a second field period delayed by the delay circuit for one field period from that of the first field to generate a picture signal having a predetermined luminance;

a control circuit responsive to the output signals from the detection circuit to control the picture signal generation circuit and to provide control signals to the imaging device drive circuit that establish a long time exposure mode if the control circuit judges that the luminance detected by the detection circuit is lower than the predetermined luminance.

2. An image pickup apparatus according to claim 1, wherein:
the control circuit is operative during the long time exposure mode to control the picture signal generation circuit on the basis of luminance detected by the detection circuit;
the picture signal generation circuit comprises:
an addition circuit,
a first logic circuit responsive to a first control signal to couple an output of the delay circuit as an input to the addition circuit;
a second logic circuit responsive to a second control signal to couple an undelayed output of the imaging device as a first input to the addition circuit,
the first control signal is provided during the long time exposure mode, during a normal exposure mode in which the luminance detected by the detection circuit is not lower than the predetermined luminance, and during a transition period from the normal exposure mode to the long time exposure mode, but not during a transition period from the long time exposure mode to the normal exposure mode;
the second control signal is provided only during the long time exposure mode and during the transition period from the long time exposure mode to the normal exposure mode; and
the control circuit is operative to adjust the electric charge storage period of the imaging device for each field of the image signal during the long time exposure mode such that a signal outputted by the addition circuit does not exhibit an abrupt change in luminance when there is a transition between the normal exposure mode and the long time exposure mode.

3. An image pickup apparatus according to claim 1, wherein the one field period is ⅟₆₀ sec.

4. An image pickup apparatus according to claim 1, wherein the picture signal generation circuit has a nonlinear processing circuit that performs a predetermined nonlinear processing to a field of the image signal.

5. An image pickup apparatus according to claim 4, wherein the nonlinear processing circuit is a lookup table ROM.

6. An image pickup apparatus according to claim 1, wherein:
the electrical image signals are comprised of a succession of frames defined by a field period;
the control circuit is operative during the long time exposure mode:
to control the picture signal generation circuit on the basis of luminance detected by the detection circuit; and
to provide control signals to the drive circuit which produce a succession of charge storage periods, which vary in duration from an initial short euration to progressively longer durations; and
the picture signal generation circuit further includes an addition circuit that is operative to add one field of an image signal delayed by the delay circuit that has a first charge storage period, and a corresponding field of an un-delayed image signal in a succeeding frame that has a second charge storage period that is the next charge storage period in the succession of charge storage periods.

7. An image pickup apparatus according to claim 6, wherein the duration for the initial charge storage period of the long time exposure mode is longer by a predetermined small amount than one-half the field period, and increases toward a charge storage period equal to the field period.

8. An image pickup apparatus according to claim 6, wherein the picture signal generation circuit includes a nonlinear processing circuit that performs a predetermined nonlinear processing to the output of the addition circuit, in the long time exposure mode.

9. An image pick up apparatus comprising:
an imaging device for imaging a subject to output an image pickup signal;
an imaging device drive circuit for outputting a drive signal which can drive said imaging device for a first electric charge storage period to output a first field of image pickup signal and also drive said imaging device for a second electric charge storage period to output a second field of image pickup signal which is continuous with said first field of image pickup signal;
a signal processing circuit for processing said image pickup signal;
a detection circuit for detecting a luminance signal from said image pickup signal outputted from said imaging device;
a comparison circuit for comparing said luminance signal detected by said detection circuit and a predetermined luminance value; and
a control circuit which sends out a control signal to said imaging device drive circuit based on the result of comparison in said comparison circuit to control the electric charge storage periods of said imaging device and also sends out a predetermined coefficient signal to said signal processing circuit to process said image pickup signal,
wherein said signal processing circuit comprises:
a field delay circuit which delays said first field of image pickup signal outputted from said imaging device by one field period;
a first multiplier circuit which multiplies said first field of image pickup signal delayed by said field delay circuit by a first coefficient signal set by said control circuit based on the result of comparison in said comparison circuit;
a second multiplier circuit which multiplies said second field of image pickup signal outputted from said imaging device by a second coefficient signal set by said control circuit based on the result of comparison in said comparison circuit; and
an adder circuit which adds an output signal of said first multiplier circuit and an output signal of said second multiplier circuit.

10. An image pickup apparatus comprising:
a charge storage type imaging device that converts subject images into electrical image signals, each image signal being characterized by a field period;
a drive circuit that determines an exposure time for an image by controlling the charge storage period of the imaging device;
a detection circuit operative to generate output signals according to luminance levels of fields of the image signals;

a picture signal generation circuit operative to generate a picture signal having a predetermined luminance; and a control circuit responsive to the output signals from the detection circuit to control the picture signal generation circuit and to provide control signals to the imaging device drive circuit that establish a long time exposure mode if the control circuit judges that the luminance detected by the detection circuit is lower than the predetermined luminance;

wherein the picture signal generation circuit includes:

a delay circuit;

a nonlinear processing circuit that performs predetermined nonlinear processing to the image signal using a first nonlinear function in the long time exposure mode and a second nonlinear function during a normal exposure mode for which the control circuit judges that the luminance detected by the detection circuit is not lower than the predetermined luminance; and an addition circuit that is operative during the long time exposure mode to add a first signal, which has been generated using a first charge storage time in one field period, processed through the nonlinear processing circuit, and delayed by the delay circuit, and a second signal, which has been generated using a second charge storage time in one field period in a next stage, and processed through the nonlinear processing circuit, but has not been delayed by the delay circuit.

11. An image pickup apparatus according to claim 10, wherein the first electric charge storage period and the second electric charge storage period are electric charge storage periods at the time of high-speed shutter.

12. An image pickup apparatus according to claim 10, wherein the nonlinear processing circuit is a lookup table ROM.

13. An image pickup apparatus according to claim 10, wherein, when the second nonlinear function to an input signal x is f(x), the first nonlinear function g(x) is:

$g(x)=f(2x)/2.$

14. An image pickup apparatus comprising:

a charge storage type imaging device that converts subject images into electrical image signals comprised of a succession of frames defined by a field period;

a drive circuit that determines an exposure time for an image by controlling the charge storage period of the imaging device;

a detection circuit operative to generate output signals according to luminance levels of fields of the image signals;

a picture signal generation circuit operative to generate a picture signal having a predetermined luminance; and a control circuit responsive to the output signals from the detection circuit to control the picture signal generation circuit and to provide control signals that establish a long time exposure mode if the control circuit judges that luminance levels detected by the detection circuit are lower than a predetermined luminance, the control circuit being operative during the long time exposure mode:

to control the picture signal generation circuit on the basis of luminance detected by the detection circuit; and to provide control signals to the drive circuit which produce a succession of charge storage periods;

wherein the picture signal generation circuit includes:

a delay circuit that delays a signal from the imaging device by one field period; and an addition circuit, the addition circuit being operative to add one field of an image signal delayed by the delay circuit that has a first charge storage period, and a corresponding field of an un-delayed image signal in a succeeding frame that has a second charge storage period that is the next charge storage period in the sequence of charge storage periods; and a nonlinear processing circuit comprised of a lookup table ROM that performs a predetermined nonlinear processing to an output of the addition circuit.

15. An image pickup apparatus comprising:

a photoelectric imaging device capable of producing an electrical signal output representative of an image characterized by a luminance;

an image exposure control circuit that controls exposure time of the imaging device;

an image processing circuit responsive to the electrical signal output of the imaging device to determine the luminance of the image;

a comparison circuit operative to generate a control signal if the luminance falls below a predetermined value;

the image exposure control circuit being operative in response to the control signal to gradually increase the exposure time for the image from a first value to a higher value in accordance with the luminance thereof.

* * * * *